United States Patent
Chi et al.

(10) Patent No.: US 8,930,733 B2
(45) Date of Patent: Jan. 6, 2015

(54) SEPARATING POWER DOMAINS OF CENTRAL PROCESSING UNITS

(75) Inventors: Shyh-An Chi, Hsin-Chu (TW); Jyy Anne Lee, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 649 days.

(21) Appl. No.: 12/751,670

(22) Filed: Mar. 31, 2010

(65) Prior Publication Data

US 2010/0318816 A1 Dec. 16, 2010

Related U.S. Application Data

(60) Provisional application No. 61/186,728, filed on Jun. 12, 2009.

(51) Int. Cl.
*G06F 1/32* (2006.01)
*G06F 1/26* (2006.01)

(52) U.S. Cl.
CPC ............ *G06F 1/3203* (2013.01); *Y02B 60/1285* (2013.01); *Y02B 60/1282* (2013.01); *G06F 1/3296* (2013.01); *Y02B 60/1278* (2013.01); *G06F 1/3287* (2013.01); *G06F 1/26* (2013.01)
USPC .......................................... 713/320; 713/322

(58) Field of Classification Search
CPC ... G06F 1/3203; G06F 1/3296; G06F 1/3287; G06F 1/26; Y02B 60/1278; Y02B 1/1282; Y02B 1/1285
USPC ................................................. 713/300–324
See application file for complete search history.

(56) References Cited

U.S. PATENT DOCUMENTS

| | | | |
|---|---|---|---|
| 7,812,408 | B1 * | 10/2010 | Ratnakumar et al. .......... 257/391 |
| 2005/0189930 | A1 * | 9/2005 | Wu et al. ........................ 323/280 |
| 2007/0016810 | A1 * | 1/2007 | Ono ............................... 713/300 |
| 2007/0150763 | A1 | 6/2007 | Yang et al. |
| 2008/0001795 | A1 * | 1/2008 | Arabi et al. .................... 341/107 |
| 2008/0244278 | A1 * | 10/2008 | Monferrer et al. ............. 713/300 |
| 2009/0106576 | A1 * | 4/2009 | Jacobowitz et al. ........... 713/501 |
| 2009/0167270 | A1 * | 7/2009 | Lam et al. ...................... 323/283 |
| 2009/0172283 | A1 * | 7/2009 | Khellah et al. ................ 711/118 |

OTHER PUBLICATIONS

Flautner, K., et al., "A Combined Hardware-Software Approach for Low-Power SoCs: Applying Adaptive Voltage Scaling and Intelligent Energy Management Software," DesignCon 2003: System-on-Chip and ASIC Design Conference, 17 pages.
Lee, J., et al., "Dynamic Voltage and Frequency Scaling (DVFS) Scheme for Multi-Domains Power Management," IEEE Asian Solid-State Circuits Conference, Nov. 12-14, 2007, Jeju, Korea, pp. 360-363.
Suleiman, D. R., et al., "Dynamic Voltage Frequency Scaling (DVFS) for Microprocessors Power and Energy Reduction," 4th International Conference on Electrical and Electronics Engineering, Dec. 2005, 5 pages.

* cited by examiner

*Primary Examiner* — Dennis M Butler
(74) *Attorney, Agent, or Firm* — Slater & Matsil, L.L.P.

(57) ABSTRACT

A circuit includes a central processing unit (CPU), which includes a first memory block having a first power domain; and a core block signally connected to the first memory block and having a second power domain disconnected from the first power domain.

24 Claims, 7 Drawing Sheets

SEPARATING POWER DOMAINS OF CENTRAL PROCESSING UNITS

This application claims the benefit of U.S. Provisional Application No. 61/186,728 filed on Jun. 12, 2009, entitled "Separating Power Domains of Central Processing Units," which application is hereby incorporated herein by reference.

TECHNICAL FIELD

This invention relates generally to power management schemes of central processing units (CPUs).

BACKGROUND

Central processing units (CPUs) are widely used in personal computers, and embedded applications, such as videos, graphics, wireless communications, and the like, are key components of many system-on-chip (SoC) applications. A common requirement to the design of CPUs is to increase their energy efficiency. The energy efficiency may be measured using a performance to power ratio, which may be, for example, million instructions per second (MIPS)/mW or million operations per second (MOPS)/mW. MIPS are units for expressing performance and indicate how many millions of instructions the CPU can process per second.

In general, power consumption is proportional to the square of an applied power supply voltage. A decrease in the power supply voltage is hence the most effective way to reduce power consumption. In a whole system, the clock frequency of a CPU is the highest among all the necessary building blocks in order to meet application requirements. As a result, power consumption and heat generation are also the highest among all building blocks. Accordingly, reducing a CPU's power consumption is the most effective way to reduce the system's overall power consumption. However, reducing the power supply voltage of a CPU may result in the speed of the CPU being reduced. Dynamic power supply control thus comes into play. Known dynamic power supply control techniques include dynamic voltage and frequency scaling (DVFS) techniques and adaptive voltage scaling (AVS) techniques, which have been used to improve energy efficiency. DVFS and AVS techniques have the ability to dynamically reduce power supply voltage to satisfy different operating conditions and different operation requirements. For example, if it is determined that a low performance is required or the external environment allows for a reduced power supply voltage, the power supply voltage provided to the CPU is reduced. Otherwise, the power supply voltage is maintained or even increased.

The DVFS and AVS techniques, however, suffer from limitations in both SoC and system-in-package (SiP) applications. For example, when integrated on SoC applications, a CPU may include embedded memories, such as level-1 cache memories. Referring to FIG. 1, CPU 100 includes memory block 102 and core block 104. Core block 104 is built in libraries and stored as "standard cells." These libraries contain large numbers of pre-designed circuits (also referred to as basic building blocks). Voltage regulator module 106 generates power supply voltage VDD and provides power supply voltage VDD to CPU 100. DVFS/AVS system 108 determines the magnitude of, and controls voltage regulator module 106 to generate, the desirable power supply voltage VDD.

The magnitude of power supply voltage VDD must be high enough to satisfy the Vcc_min requirement of memory block 102, wherein Vcc_min is the minimum power supply voltage needed to reliably perform read and write operations on memory block 102. Unfortunately, the Vcc_min is typically greater than the minimum operation voltage of core block 104. This means that a reduction in the power consumption of core block 104 is capped by the requirement of memory block 102.

SUMMARY OF THE INVENTION

In accordance with one aspect of the present invention, a circuit includes a central processing unit (CPU), which includes a first memory block having a first power domain; and a core block signally connected to the first memory block and having a second power domain disconnected from the first power domain.

In accordance with another aspect of the present invention, a circuit includes a CPU. The CPU includes a first memory block having a first power domain; and a second memory block having a second power domain separated from the first power domain. The circuit further includes a first voltage regulator module connected to the first memory block and configured to generate a first operation voltage for the first power domain; a first dynamic voltage controller connected to, and controlling, the first voltage regulator module to generate the first operation voltage; and a second voltage regulator module separated from the first voltage regulator module and connected to the core block. The second voltage regulator module is configured to generate a second operation voltage different from the first operation voltage for the second power domain.

The advantageous features of the present invention include maximized energy efficiency in the CPU and flexible power management schemes.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

A novel power management scheme for central processing units (CPUs) is provided. The variations and the operation of the embodiment are then discussed. Throughout the various views and illustrative embodiments of the present invention, like reference numbers are used to designate like elements.

Figure 1:
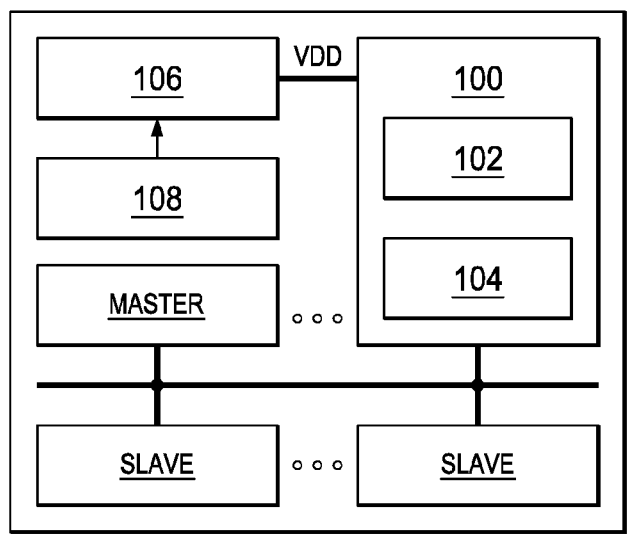
FIG. 1 illustrates a conventional power management scheme for a central processing unit (CPU)
Figure 2:
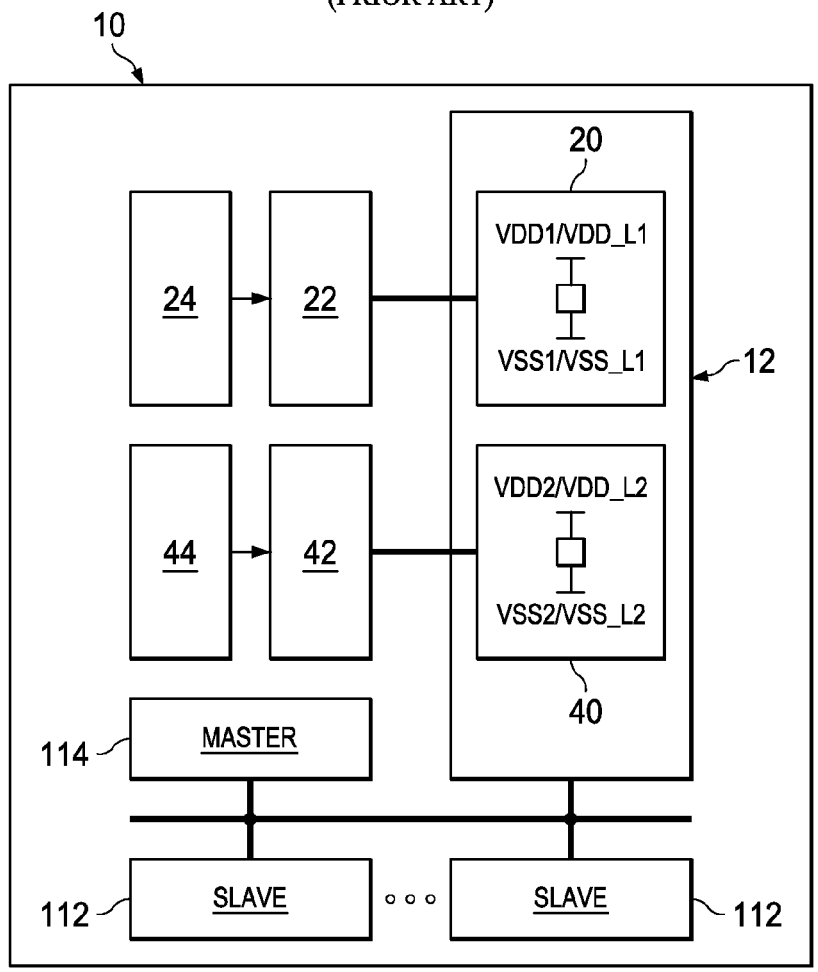
FIGS. 2 through 7 are embodiments of the present invention, wherein power domains of memory blocks in CPUs are separated from power domains of core blocks.

FIG. 2 illustrates an embodiment of the present invention, which includes CPU 12. Chip 10, in which CPU 12 is located, may include system-on-chip (SoC) applications. Besides CPU 12, chip 10 may also include additional components, including, but not limited to, additional master block 114 and slave blocks 112. Each of blocks 114 and 112 may adopt a same power management scheme as CPU 12, as will be discussed in detail in subsequent paragraphs. Other components, such as additional memories separated from CPU 12, slave blocks 112, and master block 114, may also be included. CPU 12 includes memory block 20, which may be embedded inside, although it can also be external to, CPU 12. CPU 12 also includes core block 40, which may be signally connected to memory block 20. That is, core block 40 may access memory block 20. In an exemplary embodiment, memory block 20 may include a level-1 (L1) cache. Core block 40, which may also be a logic circuit, may include an instruction fetch circuit, an instruction decode circuit, a register file circuit, a cache controller and the like.

Memory block 20 and core block 40 may have separated power domains. Throughout the description, the term "operation voltage" refers to the positive power supply voltage, which is also known as VDD. In memory block 20, the power domain includes power line VDD_L1, which carries positive operation voltage VDD1, and power line VSS_L1, which carries voltage VSS1 that is lower than voltage VDD1, wherein voltage VSS1 may be an electrical ground voltage. In core block 40, the power domain includes power line VDD_L2, which carries positive operation voltage VDD2, and power line VSS_L2, which carries voltage VSS2 lower than voltage VDD2. Again, voltage VSS2 may be an electrical ground voltage. The separate power domains of memory block 20 and core block 40 mean that power line VDD_L1 is separate from power line VDD_L2, and hence operation voltage VDD1 is not tied to operation voltage VDD2. In an embodiment, with the separate power domains, power line VDD_L1 is separated from power line VDD_L2, and power line VSS_L1 is separated from power line VSS_L2. In alternative embodiments, with the separate power domains, power line VDD_L1 is separated from power line VDD_L2, while power line VSS_L1 is interconnected to power line VSS_L2.

Memory block 20 is connected to voltage regulator module 22 and to dynamic voltage controller 24 that controls voltage regulator module 22 to generate desirable operation voltage VDD1 for operating memory block 20. Voltage regulator module 22 is capable of adjusting operation voltage VDD1 to different levels, which may include a list of voltages, and/or a continuously-adjustable voltage. The generated voltage VDD1 depends on the control signal provided by dynamic voltage controller 24. In an embodiment, dynamic voltage controller 24 adopts a dynamic voltage and frequency scaling (DVFS) technology, which is an energy-saving technology that may vary the frequency and voltage of a processor in real-time according to processing needs. For example, if CPU 12 needs to process a heavy-load work (such as a video application), dynamic voltage controller 24 that adopts the DVFS technology may control voltage regulator module 22 to generate a high operation voltage VDD1, so that the performance and the frequency of CPU 12 may be increased. Alternatively, if CPU 12 needs to process a light-load work (such as an audio application), dynamic voltage controller 24 that adopts the DVFS technology may control voltage regulator module 22 to generate a low operation voltage VDD1, so that the performance and the frequency of CPU 12 may be reduced. In alternative embodiments, dynamic voltage controller 24 adopts an adaptive voltage scaling (AVS) technology, which uses a closed-loop monitoring system to monitor system margin by comparing expected and actual operating conditions. By using the AVS technology, operation voltage VDD1 can be reduced (optimized) without sacrificing operational stability. In alternative embodiments, dynamic voltage controller 24 adopts both DVFS and AVS technologies. By using dynamic voltage controller 24 and voltage regulator module 22, operation voltage VDD1 that is provided to memory block 20 may be adjusted to optimize the operation and the power consumption of memory block 20.

Core block 40 is connected to voltage regulator module 42 and dynamic voltage controller 44 that controls voltage regulator module 42 to generate desirable operation voltage VDD2 for operating core block 40. Similarly, voltage regulator module 42 is capable of adjusting operation voltage VDD2 to different levels, which may include a list of voltages and/or a continuously-adjustable voltage. The generated voltage VDD2 also depends on the control signal provided by dynamic voltage controller 44. The available voltages VDD1 and VDD2 may be different from, or identical to, each other. For example, the available voltages VDD1 that can be generated by voltage regulator module 22 may form a first voltage list, while the available voltages VDD2 that can be generated by voltage regulator module 42 may form a second voltage list. At least one voltage is in one of the first voltage list and the second voltage list, but not in the other. Dynamic voltage controller 44 may also adopt DVFS and/or AVS technologies to generate desirable operation voltage VDD2, so that operation voltage VDD2 provided to core block 40 may be adjusted to optimize the operation and the power consumption of core block 40. Voltage regulator modules 22 and 42 may be identical to each other, or may be different from each other, for example, having different designs.

Since the power domains of memory block 20 and core block 40 are separated, each of memory block 20 and core block 40 may be provided with an optimized operation voltage that is not restricted by the required operation voltage of the other. For example, at a low-power mode that does not require a high voltage, operation voltage VDD2 may be reduced to 0.7V so that the power consumption of core circuit 40 is low. Memory block 20 may be operated at 1.0V to maintain an adequate static noise margin to meet the Vcc min requirement.

Figure 3:
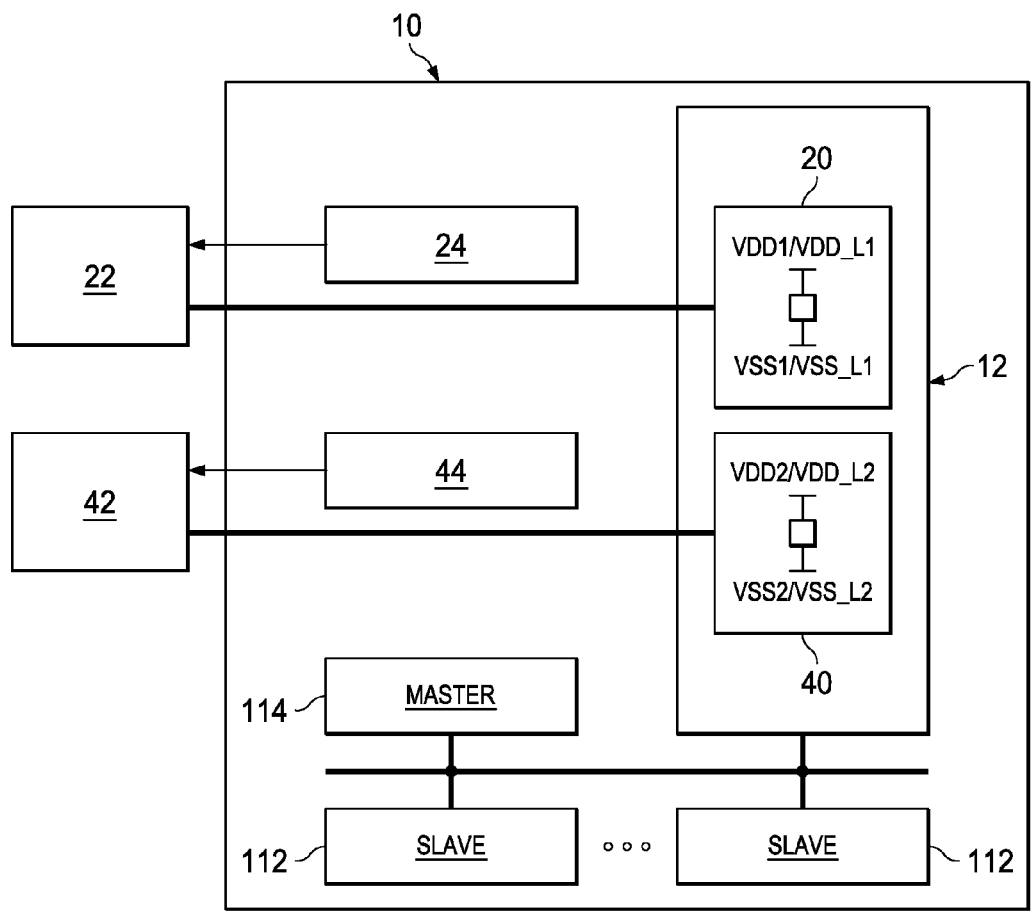

FIG. 3 illustrates an alternative embodiment of the present invention. This embodiment is essentially the same as the embodiment shown in FIG. 2, except that voltage regulator modules 22 and 42 are external to chip 10. Since voltage regulator modules 22 and 42 may include analog circuits, separating them from the digital circuits in chip 10 may increase the yield in the manufacturing of chip 10.

Figure 4:
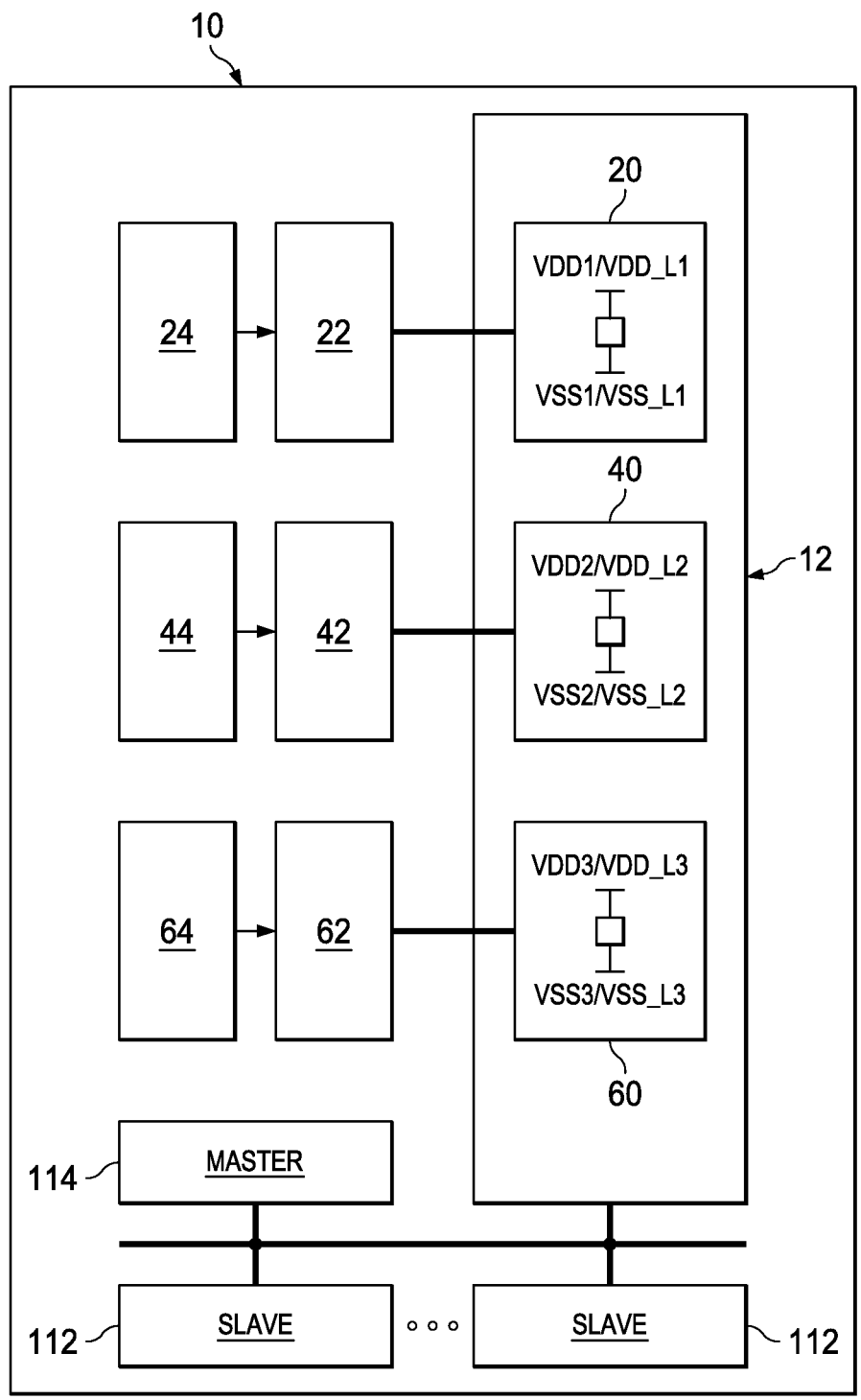

Referring to FIG. 4, CPU 12 includes additional memory block 60 connected to voltage regulator module 62, which may have essentially the same function as voltage regulator modules 22 and 42. Voltage regulator 62 is connected to, and controlled by, dynamic voltage controller 64, which may also have essentially the same function as dynamic voltage controllers 24 and 44. The power domain of memory block 60 may be separated from the power domains of memory block 20 and/or core block 40. Accordingly, power line VDD_L3 is disconnected from power lines VDD_L1 and/or VDD_L2. Further, power line VSS_L3 may also be disconnected from power lines VSS_L1 and/or VSS_L2, although two, or all of three, of them may be interconnected. In an embodiment, memory block 20 includes an L1 cache, while memory block 60 includes a level-2 (L2) cache. In alternative embodiments, memory blocks 20 and 60 comprise different types of memories selected from, but not limited to, non-volatile memories (flash memories), magneto-resistive random access memory (MRAM), static random access memory (SRAM), phase change random access memory (PCRAM), dynamic random access memory (DRAM), resistive random access memory (RRAM), and the like.

Figure 5:
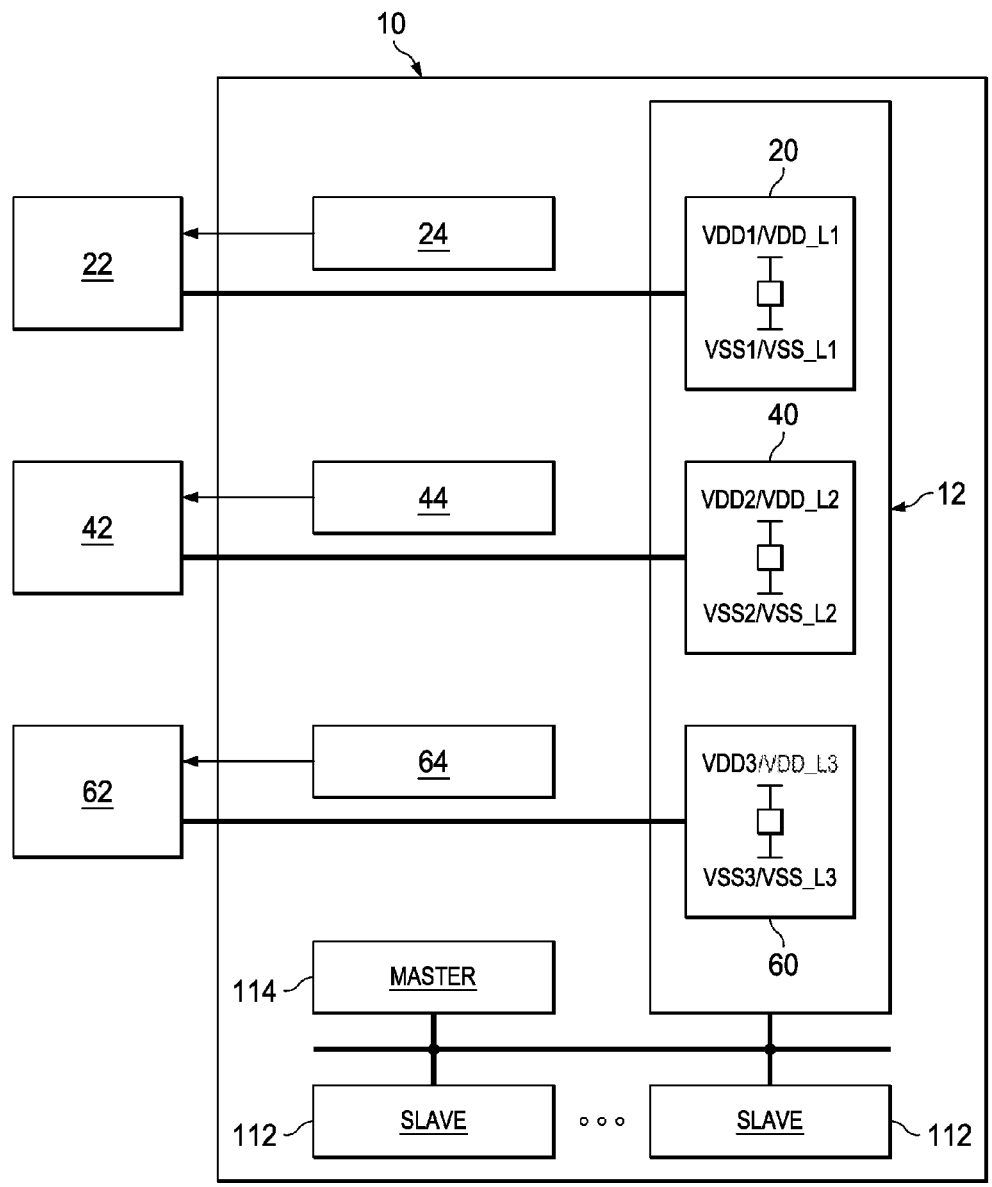

FIG. 5 illustrates an alternative embodiment of the present invention. This embodiment is essentially the same as the embodiment shown in FIG. 4, except that voltage regulator modules 22, 42, and 62 are external to chip 10.

Figure 6:
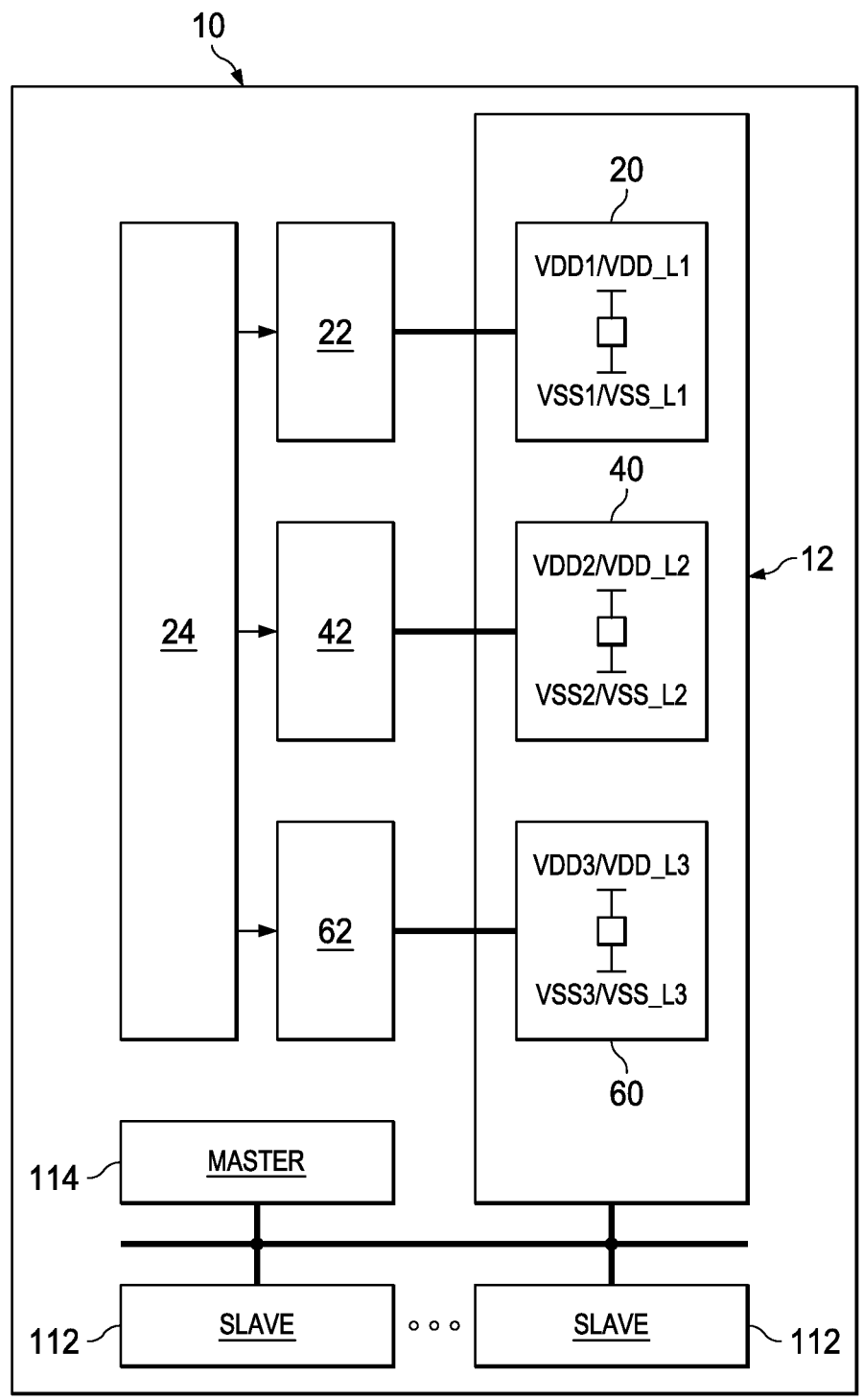

In FIG. 6, each of memory block 20, additional memory block 60, and core block 40 are connected to a separate voltage regulator module, namely voltage regulator modules 22, 42, and 62. A common dynamic voltage controller 24 controls voltage regulator modules 22, 42 and 62. Again, the power domains of memory block 20, additional memory block 60, and core block 40 are separated from each other, and hence the respective power supply voltages VDD1, VDD3, and VDD2 may be optimized and may be different from each other.

Figure 7:
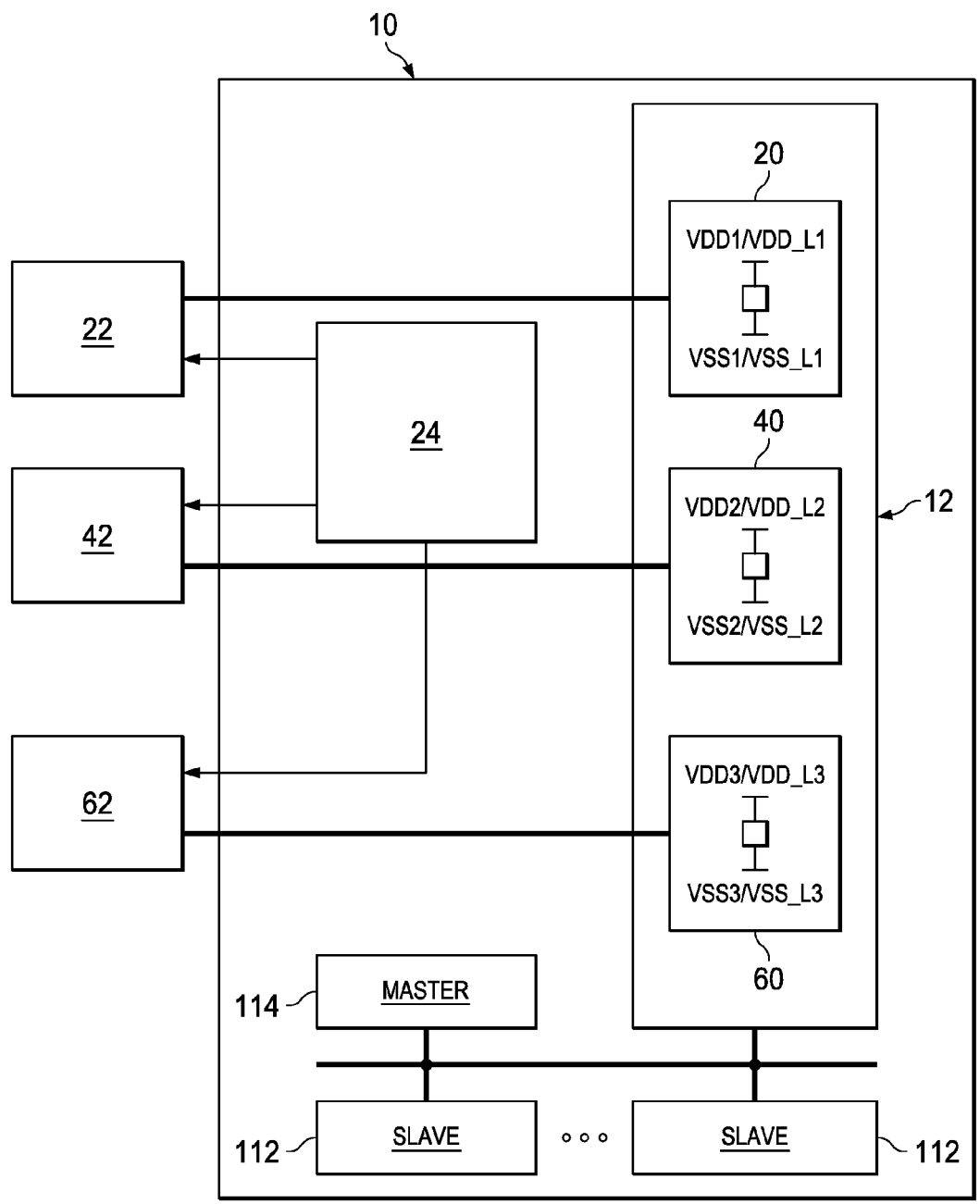

FIG. 7 illustrates an alternative embodiment of the present invention. This embodiment is essentially the same as the embodiment shown in FIG. 6, except that voltage regulator modules 22, 42, and 62 are external to chip 10. Again, in each of FIGS. 5 through 7, like elements are used to designate like components as shown in FIG. 4.

Figure 8:
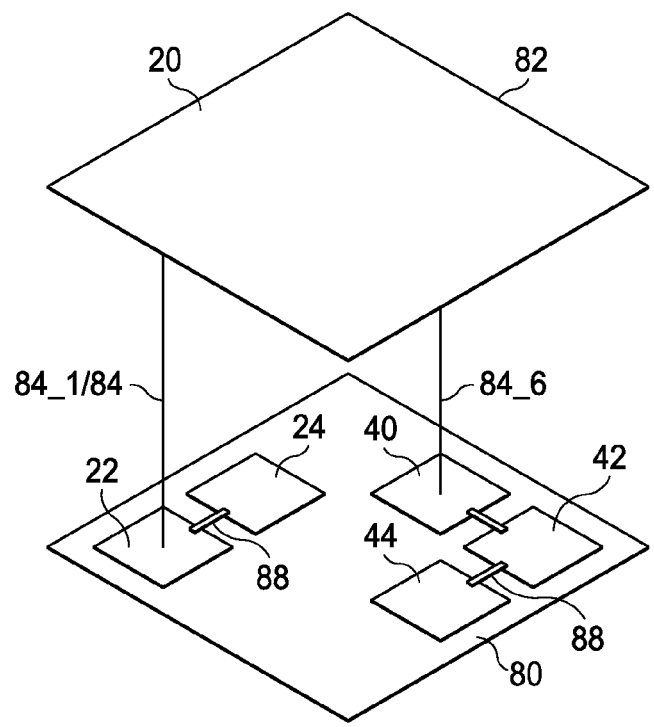
FIGS. 8 and 9 are system-in-package (SiP) applications in accordance with embodiments of the present invention.
Figure 9:
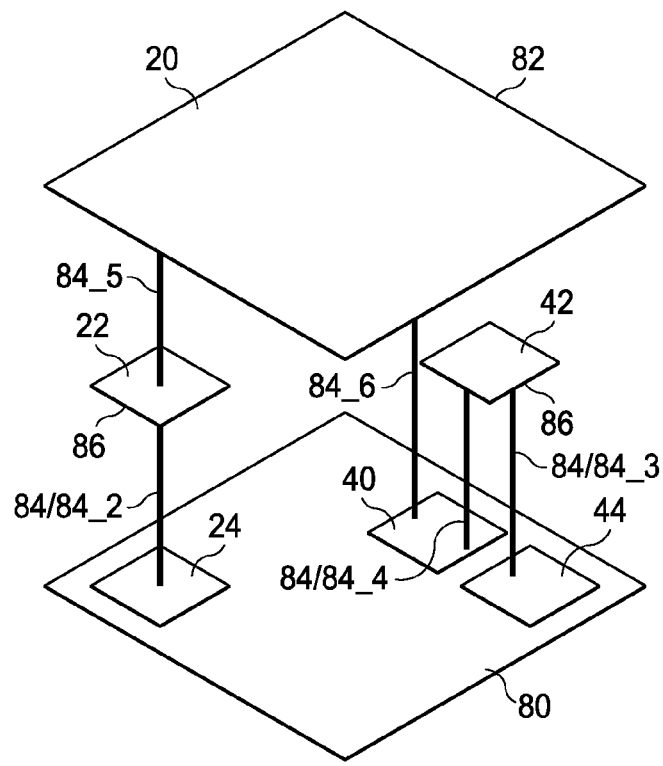

The embodiments shown in FIGS. 2 through 7 are SoC applications. FIGS. 8 and 9 illustrate system-in-package (SiP) applications. Referring to FIG. 8, core block 40, voltage regulator modules 22 and 42, and dynamic voltage controllers 24 and 44 are in die 80. Memory block 20 is in another die 82. The connections such as the connection between core block 40 and memory block 20 and the connection between voltage regulator module 22 and memory block 20 may be made through through-silicon vias (TSVs) 84. Dies 80 and 20 may be combined into a same package.

Core block 40 and dynamic voltage controllers 24 and 44 determine the optimum operation voltages for core block 40 and memory block 20, respectively, according to process/temperature conditions and/or software commands, and send control signals to voltage regulator modules 22 and 42 through signal lines 88. Voltage regulator module 22 generates a corresponding voltage for memory block 20, and provides the voltage to memory 20 through TSV 84_1. Voltage regulator module 42 generates a corresponding voltage for core block 40, and provides the voltage to core block 40. TSV 84_6 is for providing control signals for address/data read/write control.

FIG. 9 illustrates another embodiment, wherein core block 40 and dynamic voltage controllers 24 and 44 are in die 80, while memory block 20 is in die 82. Voltage regulator modules 22 and 42 are each in a separate die 86. Again, the connections between dies 80, 82, and 86 are made through through-silicon vias (TSVs) 84. Dies 80, 84, and 86 may be combined into a same package. Again, TSV 84_6 is for providing control signals for address/data read/write control.

Core block 40 and dynamic voltage controllers 24 and 44 determine the operating voltages for core block 40 and memory block 20 according to process/temperature conditions and/or software commands, and send control signals to voltage regulator modules 22 and 42 through TSV 84_2 and TSV 84_3, respectively. Voltage regulator modules 22 and 42 generate operation voltages for core block 40 and memory block 20 and provide the operation voltage to core block 40 and memory block 20 through TSVs 84_4 and 84_5, respectively.

By separating the power domains of memory blocks and core blocks in CPUs, the operation voltages of the memory blocks and the core blocks may be adjusted to optimum values, so that the power consumption of the CPUs can be minimized, while the performance of the CPUs can still meet requirements. Experiments have revealed that by separating the power domains of memory blocks and core blocks, the power consumption of CPUs can be reduced up to 20 percent as compared to similar CPUs having un-separated power domains.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. In addition, each claim constitutes a separate embodiment, and the combination of various claims and embodiments are within the scope of the invention.

What is claimed is:

1. A circuit comprising:
   a central processing unit (CPU) comprising:
      a first memory block having a first power domain; and
      a core block signally connected to the first memory block and having a second power domain; and
   one or more dynamic voltage controllers dynamically controlling a first operational voltage of the first power domain and dynamically controlling a second operational voltage of the second power domain, the first operational voltage and second operational voltage controlled separately and during operation of the CPU, wherein at least the second operational voltage is controlled according to processing needs, the second operational voltage increased according to increased processing needs, wherein the one or more dynamic voltage controllers and the core block are configured to determine the first operational voltage and the second operational voltage, and wherein the one or more dynamic voltage controllers is configured to set the second operational voltage to a voltage level lower than the first operational voltage.

2. The circuit of claim 1 further comprising:
   a first voltage regulator module connected to the first memory block; and
   a second voltage regulator module connected to the core block, wherein the first voltage regulator module and the second voltage regulator module are separate voltage regulator modules;
   wherein the one or more dynamic voltage controllers are connected to, and control, each of the first voltage regulator module and the second voltage regulator module.

3. The circuit of claim 2, wherein the first voltage regulator module and the second voltage regulator module are in a same die as the CPU.

4. The circuit of claim 2, wherein the first voltage regulator module and the second voltage regulator module are external to a die in which the CPU is located.

5. The circuit of claim 2, wherein the one or more dynamic voltage controllers comprises:
   a first dynamic voltage controller connected to, and controlling, the first voltage regulator module; and a second dynamic voltage controller connected to, and controlling, the second voltage regulator module, wherein the first dynamic voltage controller and the second dynamic voltage controller are separated from each other.

6. The circuit of claim 2 wherein one of the one or more dynamic voltage controllers is connected to, and controls, both the first voltage regulator module and the second voltage regulator module.

7. The circuit of claim 2, wherein the first memory block is in a first die of a package, and wherein the core block is in a second die of the package.

8. The circuit of claim 7, wherein the first voltage regulator module and the second voltage regulator module are in the second die.

9. The circuit of claim 7, wherein the first voltage regulator module and the second voltage regulator module are in a third die and a fourth die of the package, respectively.

10. The circuit of claim 1, wherein the first operational voltage is supplied by a first VDD line and a first VSS line, and the second operational voltage is supplied by a second VDD line and a second VSS line, and wherein the first VDD line is disconnected from the second VDD line.

11. The circuit of claim 10, wherein the first VSS line is disconnected from the second VSS line.

12. The circuit of claim 10, wherein the first VSS line is connected to the second VSS line.

13. The circuit of claim 1, wherein the CPU further comprises a second memory block having a third power domain having a third operational voltage controlled separately from the first operational voltage and the second operational voltage.

14. The circuit of claim 13, wherein the first memory block and the second memory block comprise different types of memories.

15. The circuit of claim 13, wherein the first memory block is a level-1 cache and the second memory block is a level-2 cache.

16. A circuit comprising:
a central processing unit (CPU) comprising:
    a first memory block having a first power domain and comprising a first type of memory; and
    a second memory block having a second power domain separated from the first power domain, the second memory block comprising a second type of memory different from the first type of memory;
a first voltage regulator module connected to the first memory block and configured to generate a first operation voltage for the first power domain; and
a second voltage regulator module connected to the second memory block and configured to generate a second operation voltage for the second power domain, the second operation voltage different from the first operation voltage;
wherein at least one of the first operation voltage and the second operation voltage are dynamically configured according to a control signal generated in response to at least a software command received during operation of the CPU.

17. The circuit of claim 16, wherein each of the first voltage regulator module and the second voltage regulator module is configured to generate a plurality of positive voltages.

18. The circuit of claim 16, further comprising a first dynamic voltage controller connected to, and controlling, the first voltage regulator module to dynamically generate the first operation voltage during operation of the CPU;

wherein the first dynamic voltage controller adopts a technology selected from the group consisting essentially of an adaptive voltage scaling (AVS) technology, a dynamic voltage and frequency scaling (DVFS) technology, and combinations thereof.

19. The circuit of claim 18 further comprising a second dynamic voltage controller connected to, and controlling, the second voltage regulator module to generate the second operation voltage, wherein the first dynamic voltage controller and the second dynamic voltage controller are separated from each other.

20. The circuit of claim 16, wherein the first voltage regulator module and the second voltage regulator module have different designs.

21. The circuit of claim 16, wherein the first voltage regulator module is configured to provide a first list of voltages and the second voltage regulator module is configured to provide a second list of voltages, one of the first list of voltages and the second list of voltages having at least one listed voltage not in the other of the first list of voltages and the second list of voltages.

22. The circuit of claim 21, the circuit further comprising:
a first dynamic voltage controller;
a first though silicon via (TSV) disposed between the first dynamic voltage controller and the first voltage regulator, the first dynamic voltage controller transmitting control signals over the first TSV to the first voltage regulator to dynamically generate the first operation voltage during operation of the CPU; and
a second TSV disposed between the first voltage regulator and the first memory block, the first voltage regulator providing the first operational voltage over the second TSV to the first memory block.

23. A circuit comprising:
a central processing unit (CPU) comprising:
    a first memory block having a first power domain; and
    a core block signally connected to the first memory block and having a second power domain; and
one or more dynamic voltage controllers dynamically controlling a first operational voltage of the first power domain and dynamically controlling a second operational voltage of the second power domain, the first operational voltage and second operational voltage controlled separately based on determination of an optimal first operational voltage and an optimal second operational voltage by at least the core block;
wherein the one or more dynamic voltage controllers is configured to set the second operational voltage from a first voltage level to a second voltage level lower than 1.0V and different from the first voltage level and the first operational voltage; and
wherein the core block is operated at each of the first voltage level and second voltage level.

24. A circuit comprising:
a central processing unit (CPU) comprising:
    a first memory block having a first power domain in a first die; and
    a core block signally connected to the first memory block and having a second power domain in a second die stacked vertically under the first die; and
one or more dynamic voltage controllers dynamically controlling a first operational voltage of the first power domain and dynamically controlling a second operational voltage of the second power domain, the first operational voltage and second operational voltage controlled separately;

wherein the one or more dynamic voltage controllers is configured to set the second operational voltage to a voltage level lower than the first operational voltage.

* * * * *